United States Patent
Hoshikawa et al.

(10) Patent No.: US 7,812,571 B2
(45) Date of Patent: Oct. 12, 2010

(54) CHARGING DEVICE

(75) Inventors: Hisanori Hoshikawa, Osaka (JP); Youichi Tamegai, Kanagawa (JP); Isao Yamamoto, Kanagawa (JP)

(73) Assignees: Panasonic Photo & Lighting Co., Ltd., Osaka (JP); Rohm Co., Ltd., Kyoto (JP)

( * ) Notice: Subject to any disclaimer, the term of this patent is extended or adjusted under 35 U.S.C. 154(b) by 464 days.

(21) Appl. No.: 11/887,231

(22) PCT Filed: Mar. 29, 2006

(86) PCT No.: PCT/JP2006/306467
§ 371 (c)(1),
(2), (4) Date: Sep. 27, 2007

(87) PCT Pub. No.: WO2006/104195
PCT Pub. Date: Oct. 5, 2006

(65) Prior Publication Data
US 2009/0051330 A1  Feb. 26, 2009

(30) Foreign Application Priority Data
Mar. 29, 2005  (JP) ............................. 2005-093360

(51) Int. Cl.
*H02J 7/00* (2006.01)
(52) U.S. Cl. ..................................... 320/166; 320/167
(58) Field of Classification Search .......... 320/166–167
See application file for complete search history.

(56) References Cited

U.S. PATENT DOCUMENTS 6,411,064 B1 * 6/2002 Brink .......................... 320/166
6,518,733 B1 2/2003 Schenkel et al. ............ 320/166

FOREIGN PATENT DOCUMENTS

JP     54-144922    11/1979
JP     11-55944     2/1999

* cited by examiner

*Primary Examiner*—Edward Tso
*Assistant Examiner*—Samuel Berhanu
(74) *Attorney, Agent, or Firm*—Steptoe & Johnson LLP

(57) ABSTRACT

There is provided a charging device capable of improving charging efficiency and reducing power consumption, thereby increasing a battery service life. The charging device charges a main capacitor (2) by rectifying output voltage boosted via a self-excitation DC-DC converter, by using a diode (D). The self-excitation DC-DC converter is configured as follows. When a current value (I1) flowing in a primary side (P) of an oscillation transformer (T) reaches a first predetermined value (IPK1) the excitation period is terminated and energy is transmitted from the primary side (P) to the secondary side (S) of the oscillation transformer (T) so as to execute a charging period for charging the main capacitor (2). The excitation period is resumed with a delay time (t1) after detecting that the current value (I2) flowing into the secondary side (S) of the oscillation transformer (T) is lowered than a second predetermined value (Ith2).

4 Claims, 5 Drawing Sheets

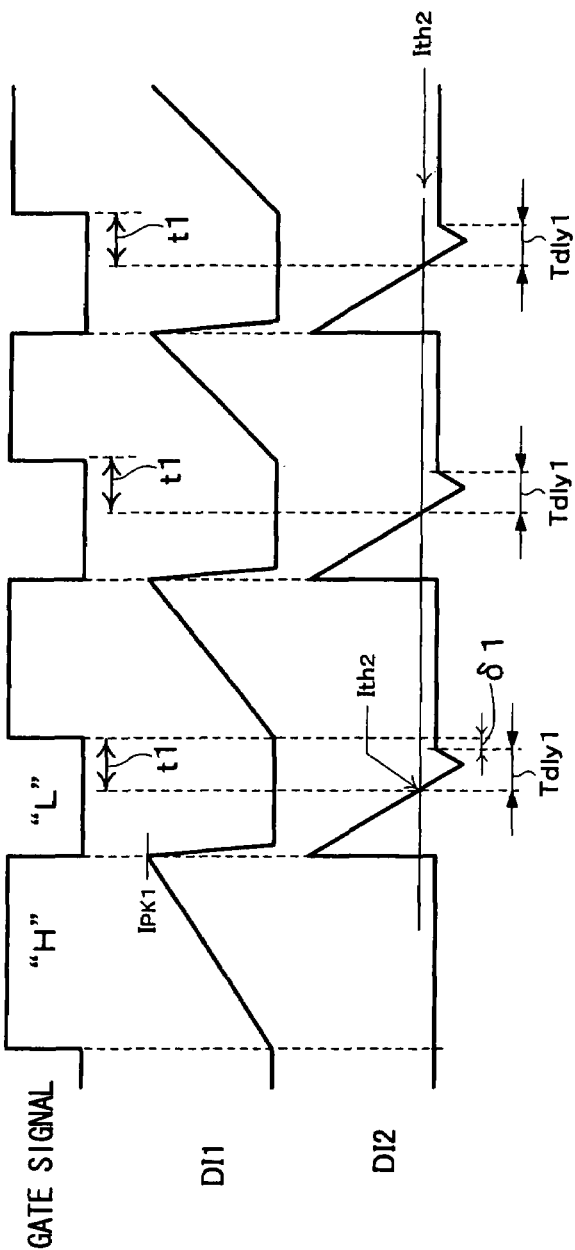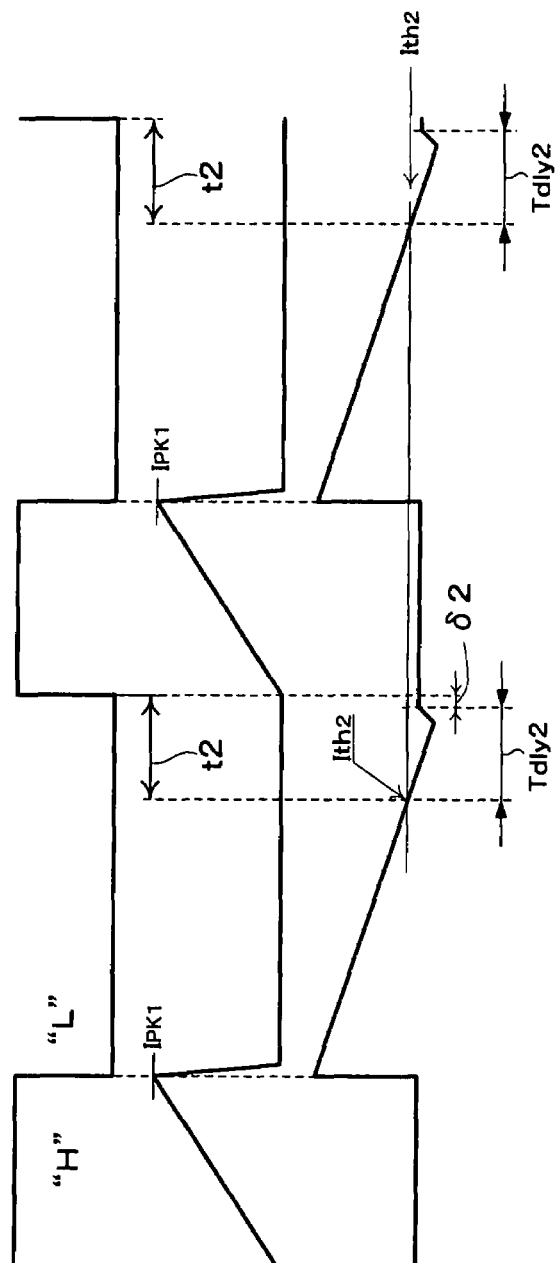
FIG. 2A GATE SIGNAL
FIG. 2B D1
FIG. 2C D2
FIG. 2D GATE SIGNAL
FIG. 2E I1
FIG. 2F I2

CHARGING DEVICE

TECHNICAL FIELD

The present invention relates to a charging device used in a strobe apparatus and the like.

BACKGROUND ART

Such a charging device is disclosed in Japanese Unexamined Patent Application Publication Nos. 11-352554, 2001-255573, and 2001-255575.

A configuration of a general charging device of a strobe apparatus will be described with reference to FIG. 5.

In the drawing, a field effect transistor Q1 is connected in series with a primary side coil P of an oscillation transformer T, and a switching operation and the like of the transistor Q1 are controlled by a control circuit 1. A main capacitor 2 is connected in parallel with a secondary side coil S of the oscillation transformer T via a diode D. A series circuit of a xenon tube 3 and an insulated gate bipolar transistor Q2 is connected in parallel with the main capacitor 2. R1 is a resistor for detecting current that flows in the primary side coil P of the oscillation transformer T, R2 is a resistor for detecting current that flows in the secondary side coil S of the oscillation transformer T, and 4 is a high-voltage trigger circuit for generating pulse voltage so as to activate the xenon tube 3.

A control circuit 1 for controlling charging and emitting operations of the strobe is designed as an application-specific integrated circuit and includes a driving circuit 5 and a discharge detection circuit 6. A configuration of the control circuit 1 will be described with reference to FIG. 6.

First, when the driving circuit 5 sends a gate signal to a gate of the transistor Q1, as shown in FIG. 6a, current flows from a battery to the primary side coil P of the oscillation transformer T, as shown in FIG. 6b. While monitoring a terminal voltage of the resistor R1, the driving circuit 5 inverts the gate signal to "L" level when current I1 of the primary side coil P reaches a peak current value IPK1. By this operation, an energy accumulated in the primary side coil P of the oscillation transformer T is discharged into the secondary side coil S of the oscillation transformer T, and the main capacitor 2 is charged with an output voltage of the secondary side coil S via the diode D.

The discharge detection circuit 6 detects that current I2 flowing from the terminal voltage of the resistor R2 to the secondary side coil S is lower than detection current Ith2 as shown in FIG. 6c and notifies the driving circuit 5 of the detection result.

In this case, the driving circuit 5 inverts the gate signal to "H" level. By repeating the procedure mentioned above, the main capacitor 2 is charged. In a case where the strobe is needed for photographing in the state where the main capacitor is fully charged, when the "H" level signal is output from a FSW terminal, the transistor Q2 is activated to ON state, and accordingly, the high-voltage trigger circuit 4 outputs a high voltage pulse of several kilo-volts, and thereby the xenon tube 3 is excited so as to emit light.

DISCLOSURE OF THE INVENTION

Problem that the Invention is to Solve

In the known configuration as described above, switching a gate of the transistor Q1 from OFF state to ON state is performed in the process of energy discharge from the primary side coil P to the secondary side coil S of the oscillation transformer T, and thus the energy accumulated in the primary side coil P is not completely discharged to the secondary side coil S.

Soon after the gate is switched to ON state in the process of a discharging operation, excessive oscillating current easily flows when the current I1 begins to rise as shown in FIG. 6b. That causes an increase in power consumption, so that there is a high possibility that an error operation A occurs. As a result, a sufficient charging efficiency of the charging device cannot be acquired.

The invention is contrived in consideration of the problem mentioned above, and it is an object of the invention to provide a charging device capable of improving charging efficiency and reducing power consumption, thereby increasing a battery service life.

Means for Solving the Problem

A charging device according to an embodiment of the invention is a strobe apparatus for charging a main capacitor by rectifying an output voltage, which is boosted by a self-excited DC-DC converter, with a diode is characterized in that a control circuit of the self excited DC-DC converter is configured to terminate an excitation period and to enter a charging period for charging the main capacitor by transmitting energy from a primary side to a secondary side of an oscillation transformer when a current value flowing in the primary side of the oscillation transformer reaches a first predetermined value, and to resume the excitation period in a delay time after detecting that a value of current flowing in the secondary side of the oscillation transformer is lower than a second predetermined value.

According to an embodiment of the invention, the charging device is characterized in that the delay time is set to be longer than a sum of a time from a time point when the value of current flowing in the secondary side of the oscillation transformer is lower than the second predetermined value to a time point when the current reaches zero and a reverse recovery time of the diode.

According to an embodiment of the invention, an application specific integrated circuit used as a control circuit of the charging device is characterized in that an excitation period is terminated when a voltage of a first external connection terminal reaches a first predetermined value, and the excitation period is resumed in a delay time after detecting that a voltage of a second external connection terminal is lower than a second predetermined value.

With such a configuration, the timing when a gate of self-excited DC-DC converter is switched from OFF to ON is set to be after the timing when secondary side diode is completely in OFF state. Therefore, it is possible to improve the charging efficiency and reduce the power consumption, and thereby it is possible to improve durability of the battery.

BRIEF DESCRIPTION OF THE DRAWINGS

FIG. 2 is a diagram illustrating waveforms of principal portions of the charging device according to the embodiment.

BEST MODE FOR CARRYING OUT THE INVENTION

Hereinafter, an embodiment of the invention will be described with reference to FIGS. 1 to 4.

Figure 1:
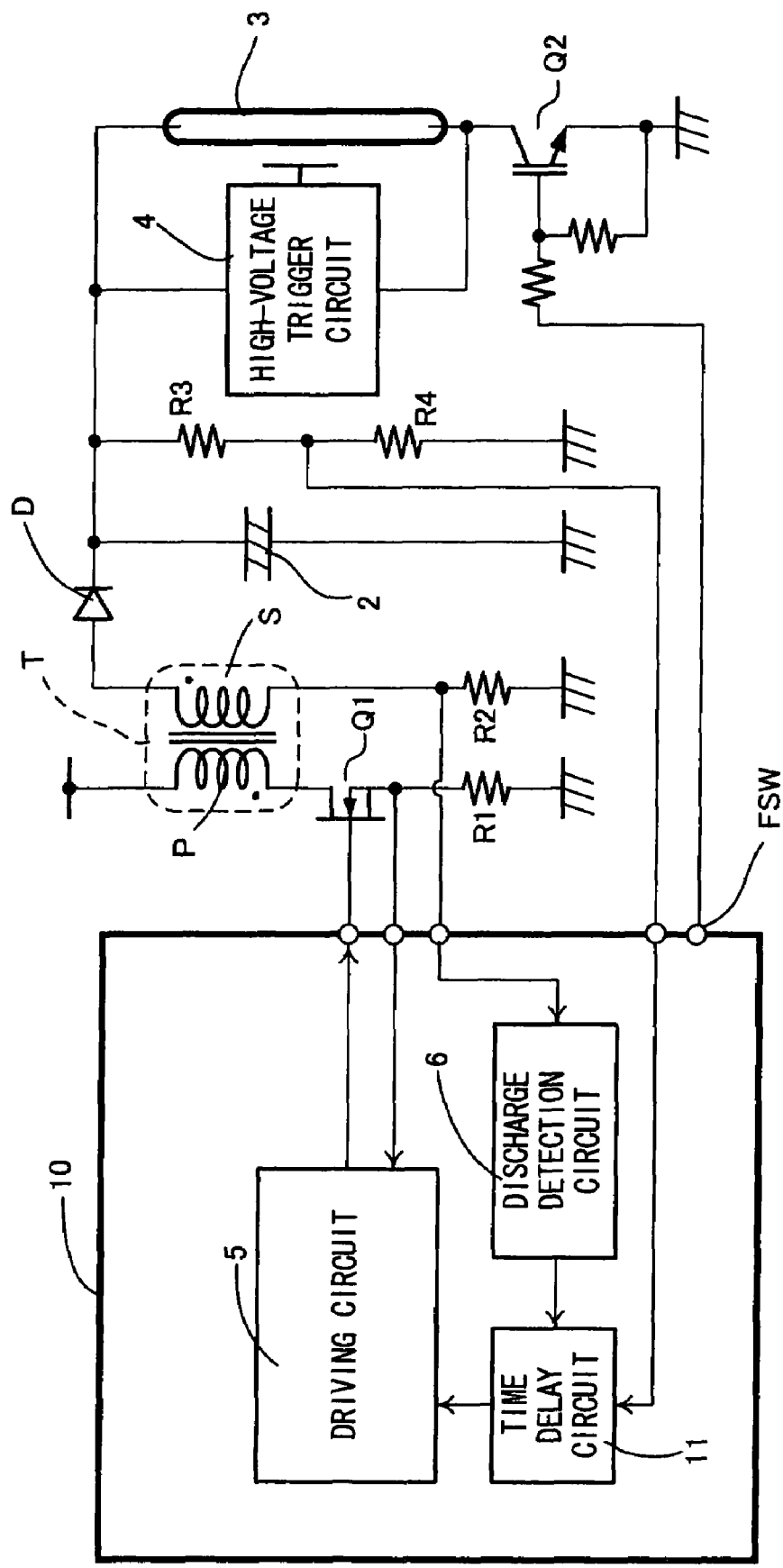
FIG. 1 is a diagram illustrating a configuration of a charging device according to an embodiment of the invention.

FIG. 1 is a strobe apparatus using a charging device according to the invention.

In the drawing, a field effect transistor (FET) Q1 is connected in series with a primary side coil P of an oscillation transformer T, and a switching operation and the like of the transistor Q1 are controlled by a control circuit 10. The control circuit 10 is designed as an application specific integrated circuit used in the strobe apparatus.

A main capacitor 2 is connected in parallel with a secondary side coil S of the oscillation transformer T via a diode D. A series circuit between a xenon tube 3 and an insulated gate bipolar transistor Q2 is connected in parallel with the main capacitor 2. R1 is a resistor for detecting current that flows in the primary side coil P of the oscillation transformer T, R2 is a resistor for detecting current that flows in the secondary side coil S of the oscillation transformer T, R3 and R4 are resistors for detecting voltage charged in the main capacitor 2, and 4 is a high-voltage trigger circuit for generating a high voltage pulse so as to activate a xenon tube 3.

The control circuit 10 for controlling charging and emitting operations of the strobe is constituted of semiconductor integrated circuits and includes a driving circuit 5, a discharge detection circuit 6, and a time delay circuit 11. A configuration of the control circuit 10 will be described with reference to FIG. 2.

FIGS. 2a, 2b, and 2c show timing diagrams of the control circuit 10 when a terminal voltage of the main capacitor 2 is mid-to-high voltage (which is 100 volts or more in the case where a fully charged voltage is 300 volts). FIGS. 2d, 2e, and 2f show timing diagrams of the control circuit 10 when a terminal voltage of the main capacitor 2 is low voltage (which is less than 50 volts in the case where a fully charged voltage is 300 volts). Additionally, the control circuit 10 determines whether the terminal voltage of the main capacitor 2 is the mid-to-high voltage or the low voltage on the basis of a voltage VC divided by the series circuit of the resistors R3 and R4.

First, the control circuit 10 will be described when the mid-to-high voltage is applied to the main capacitor 2.

When the driving circuit 5 applies a gate signal to the gate of the transistor Q1 as shown in FIG. 2a, current that linearly increases as shown in FIG. 2b flows from a battery to the primary side coil P of the oscillation transformer T, so that energy is accumulated in the primary side coil P.

While monitoring a terminal voltage of the resistor R1, the driving circuit 5 inverts the gate signal to "L" level when current I1 of the primary side coil P reaches a peak current value IPK1. By the operation, the driving circuit 5 transfers energy accumulated in the primary side coil P of the oscillation transformer T to the secondary side coil S of the oscillation transformer T, and the main capacitor 2 is charged via the diode D.

During a period when the energy is accumulated in the main capacitor 2 in the case where the transistor Q1 is in OFF-state, the discharge detection circuit 6 always checks whether current I2 flowing from the terminal voltage of the resistor R2 to the secondary side coil S is lower than detection current Ith2 as shown in FIG. 2c. When it is detected that the current I2 is lower than the detection current Ith2, the discharge detection circuit 6 notifies the driving circuit 5 of the detection result via a time delay circuit 11.

The time delay circuit 11 changes delay time in accordance with the terminal voltage of the main capacitor 2. Here, in the case where the terminal voltage of the main capacitor 2 is the mid-to-high voltage value, the delay time t1, where t1=Tdly1+δ1, is set to be a bit (time δ1) longer than the sum (Tdly1) of a time from a time point when the current of the secondary side coil S becomes equal to or less than the detection current Ith2 to a time point when the current reaches zero and a reverse recovery time of the diode D from when the current begins to flow in a reverse direction after reaching zero until the current reaches zero again.

When the delay time t1 elapses after the current of the secondary side coil S becomes equal to or lower than the detection current Ith2, the gate signal is inverted to the "H" level by the driving circuit 5, so that the transistor Q1 is switched to ON. By repeating the procedure mentioned above, the main capacitor 2 is charged.

With such a timing, switching the gate of the transistor Q1 from OFF state to ON state is performed, so that it is possible to avoid the phenomenon that current having excessive oscillation easily flows in the primary side coil P of the oscillation transformer T soon after the transistor Q1 is switched to ON. Therefore, it is possible to improve charging efficiency.

Figure 3:
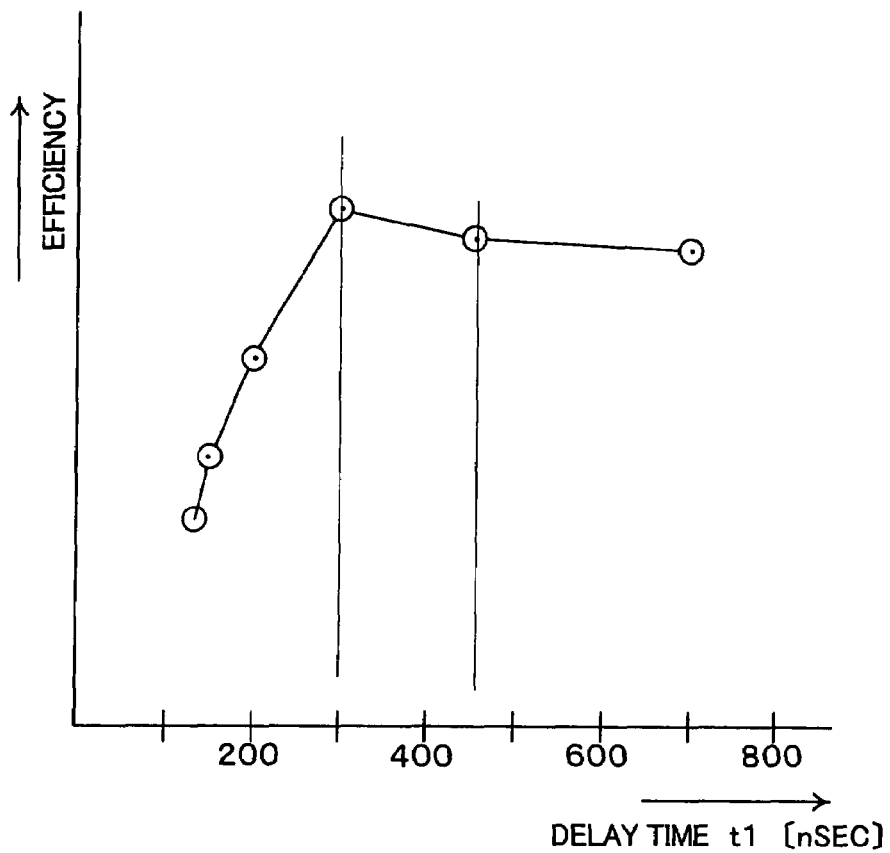
FIG. 3 is a diagram illustrating relationship between delay time and charging efficiency.
Figure 4:
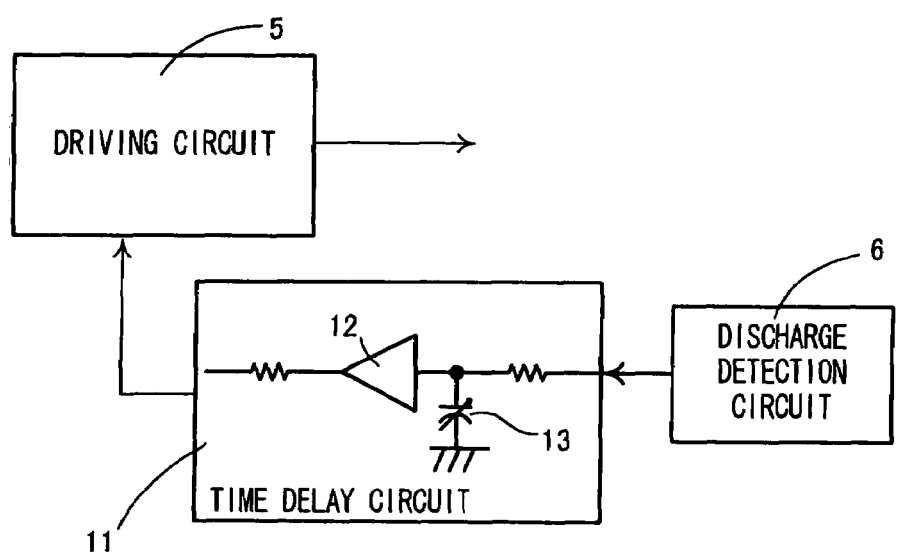
FIG. 4 is an experimental circuit diagram of a time delay circuit.
Figure 5:
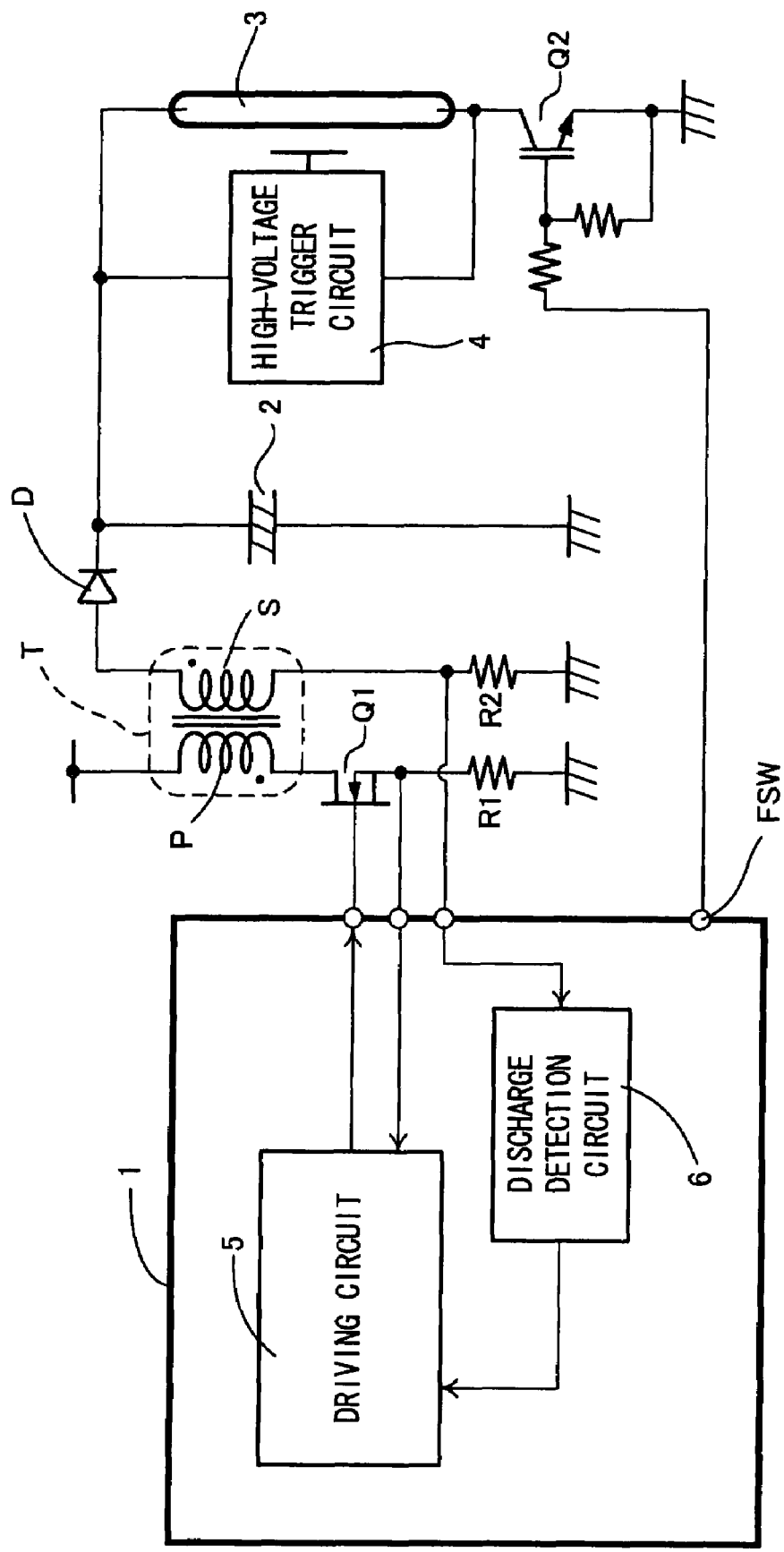
FIG. 5 is a diagram illustrating a configuration of a general charging device according to a known example.
Figures 6A, 6B, 6C, 6D:
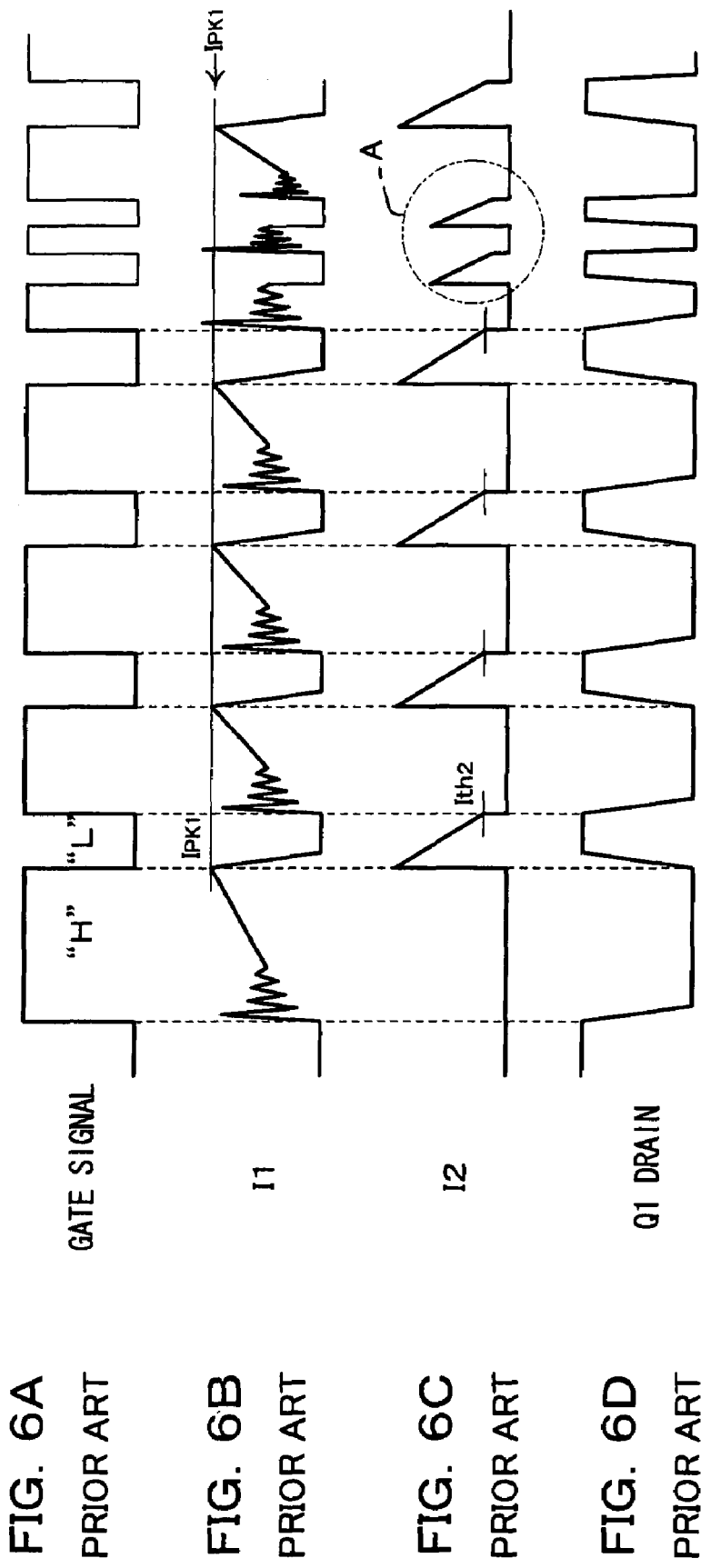
FIG. 6 is a diagram illustrating waveforms of principal portions of the general charging device according to the known example.

FIG. 3 shows data indicative of relationship between the charging efficiency and the delay time t1 when the t1 is changed in the range of 100 ns to 700 ns. FIG. 4 shows a circuit used for the above-described experiment. The time delay circuit 11 includes a buffer 12 and a capacitor 13. The capacitance of the capacitor 13 was changed in the range of 0 to 1200 PF, and thus the delay time t1 in the range of 100 ns to 700 ns was obtained. The t1 was preferably in the range of 300 ns to 450 ns as shown in FIG. 3, and the δ1 was preferably 100 ns or so.

In the case where low voltage is applied, when the control circuit 10 detects that the currents I1, I2 are lower than the detection current Ith2 as shown in FIGS. 2d, 2e, and 2f, the control circuit 10 notifies the driving circuit 5 of the detection result via a time delay circuit 11. Here, delay time t2, where t2=Tdly2+δ2, of the time delay circuit 11 is set to be a bit (time δ2) longer than the sum (Tdly2) of a time from a time point when the current of the secondary side coil S becomes equal to or less than the detection current Ith2 to a time point when the current reaches zero and a reverse recovery time of the diode D from a time point when the current begins to flow in a reverse direction after reaching zero to a time point when the current reaches zero again. When the delay time t2 elapses after the current of the secondary side coil S is lower than the detection current Ith2, the gate signal is inverted to the "H" level by the driving circuit 5, so that the transistor Q1 is switched to ON. By repeating the procedure mentioned above, the main capacitor 2 is charged. The δ2 was preferably 100 ns or so.

In the case where low voltage is applied, similarly to the case of the mid-to-high voltage application, by switching the gate of the transistor Q1 from OFF state to On state in accordance with the above-described timing, it is possible to avoid the phenomenon that excessive oscillation current easily flows in the primary side coil P of the oscillation transformer T soon after the transistor Q1 is switched to ON. Therefore, it is possible improve the charging efficiency, additionally.

In addition, it is allowed that δ1≠δ2. When δ1=δ2=0, improvement in charging efficiency can be also expected as compared with the known technology.

INDUSTRIAL APPLICABILITY

The charging device of the invention can contribute to improve performance of a strobe apparatus used in a photographing operation of a camera, a camera and mobile phone having the strobe apparatus built therein, and the like.

The invention claimed is:

1. A charging device for charging a main capacitor by rectifying an output voltage, which is boosted by a self-excited DC-DC converter, with a diode,
    wherein a control circuit of the self-excited DC-DC converter is configured to terminate an excitation period and to enter a charging period for charging the main capacitor by transmitting energy from a primary side to a secondary side of an oscillation transformer when a current value flowing in the primary side of the oscillation transformer reaches a first predetermined value, and to resume the excitation period in a delay time after detecting that a value of current flowing in the secondary side of the oscillation transformer is lower than a second predetermined value,
    and the delay time is set to be longer than a sum of a time from a time point when the value of current flowing in the secondary side of the oscillation transformer is lower than the second predetermined value to a time point when the current reaches zero and a reverse recovery time of the diode.

2. An application-specific integrated circuit used as a control circuit of the charging device according to claim 1,
    wherein an excitation period is terminated when a voltage of a first external connection terminal reaches a first predetermined value, and
    the excitation period is resumed in a delay time after detecting that a voltage of a second external connection terminal is lower than a second predetermined value.

3. An application-specific integrated circuit according to claim 2,
    further comprising a time delay circuit for changing the delay time depending on voltage of the second external connection terminal, wherein a voltage is inputted in said terminal depending on the boosted output voltage of the charging device.

4. An application-specific integrated circuit according to claim 2, further comprising a time delay circuit for changing the delay time to a range of 300 ns to 450 ns when a voltage of the second external connection terminal is 100 volts, or more where a fully charged voltage is 300 volts, in the main capacitor of the charging device.

* * * * *